United States Patent [19]

Abbott, III

[11] 4,275,539

[45] Jun. 30, 1981

[54] METHOD AND APPARATUS FOR INSULATING BUILDING BLOCKS AND THE BLOCKS PRODUCED THEREBY

[76] Inventor: Richard V. Abbott, III, 1200 E. Main St., Millville, N.J. 08332

[21] Appl. No.: 101,633

[22] Filed: Dec. 10, 1979

[51] Int. Cl.³ .............................................. B29D 27/00
[52] U.S. Cl. ................................ 52/309.11; 52/309.12; 52/405; 264/45.4; 264/46.6; 264/DIG. 11; 425/4 R
[58] Field of Search ............. 264/46.6, 45.4, DIG. 11; 425/4 R; 52/405, 309.11, 309.12

[56] References Cited

U.S. PATENT DOCUMENTS

| | | | |
|---|---|---|---|
| 2,983,963 | 5/1961 | Jodell et al. | 264/46.6 X |
| 3,075,240 | 1/1963 | Casavina et al. | 264/45.4 X |
| 3,605,365 | 9/1971 | Hastings | 264/45.4 X |
| 3,704,562 | 12/1972 | Grants | 52/405 X |
| 3,751,196 | 8/1973 | Cannon et al. | 425/4 R |
| 3,782,049 | 1/1974 | Sachs | 52/309.12 X |
| 3,885,363 | 5/1975 | Whittey | 52/405 X |
| 4,002,002 | 1/1977 | Barnhardt | 264/46.6 |
| 4,027,445 | 6/1977 | Nickerson | 52/309.12 X |
| 4,151,239 | 4/1979 | Ogden | 264/46.6 |

Primary Examiner—Philip Anderson
Attorney, Agent, or Firm—Martin L. Faigus

[57] ABSTRACT

A building block including at least one internal cavity is insulated by molding an insulating layer from expandable thermoplastic polymer particles, such as beaded polystyrene, to one or more interior surfaces of the cavity. The molding operation is carried out by positioning a male plug member within the internal cavity of the building block with at least one peripheral surface of the plug member spaced from at least one interior surface of the cavity to provide a peripheral compartment into which the polymer particles are directed for molding the layer. Thereafter, steam, under pressure, is injected into the peripheral compartment to cause the particles to expand and fuse together into an efficient insulating layer that is expanded into close conformity with the interior surface(s) of the cavity. During the steam injecting operation a positive inwardly directed external force is applied to external surfaces of at least two opposed walls of the block to counteract internal forces generated by the steam. The invention also resides in the apparatus for carrying out the method of this invention, and in the building block formed in accordance with the method of this invention.

11 Claims, 4 Drawing Figures

METHOD AND APPARATUS FOR INSULATING BUILDING BLOCKS AND THE BLOCKS PRODUCED THEREBY

TECHNICAL FIELD

This invention relates generally to the field of building blocks, and more specifically to a method and apparatus for insulating building blocks, such as masonry blocks, and the blocks produced thereby.

BACKGROUND ART

It is known to use preformed inserts of foam material to insulate masonry building blocks, as is evidenced by U.S. Pat. Nos. 3,704,562 and 3,885,363. These inserts are formed by plastic molding companies, and generally are shipped to the masonry block manufacturer or to the building site for installation into the masonry blocks. This necessitates shipping and assembly costs which desirably should be avoided. In addition, undesirable storage charges are incurred; resulting from the need to inventory the inserts.

One approach to avoiding the above disadvantages associated with employing preformed plastic inserts is disclosed in U.S. Pat. No. 4,002,002, issued to Barnhardt, Jr. (hereinafter "Barnhardt"). In Barnhardt a low viscosity thermoset-type liquid foam material, such as urethane foam, is directed into a peripheral cavity formed between a shield insert and inner surfaces of cavities provided in the masonry block. In this system it is required that the shield be maintained within the cavity until the foam material sets up, or solidifies sufficiently to become form-sustaining without the support provided by the shield.

There are several disadvantages to using urethane foam or similar thermoset-types of liquid materials to insulate masonry blocks. With respect to urethane foam, a shrinkage problem often is encountered as the foam solidifies. This can create gaps or voids in the insulating layer thereby impairing the insulating function. Modern block plants can produce three 8-inch blocks every 8 or 9 seconds. In order to employ Barnhardt's method to insulate these blocks at the rate they are produced, excessively high manpower requirements would be needed to fill the cavities with the foaming ingredients. In addition, a large number of shields would be needed since they must be maintained with the blocks until the foam solidifies. Moreover, excessive storage space needs to be provided to accommodate the blocks as the foam is solidifying. A further negative resides in the fact that utilizing urethane foam is quiet costly; being considerably more expensive than utilizing expandable polystyrene as the insulating material.

For all of the above reasons the in-situ formation of an insulating layer with a low viscosity, thermoset-type foam, such as urethane foam, is not desirable. In fact, to the best of applicant's knowledge, the technique disclosed in the Barnhardt patent has never been successfully commercialized.

As indicated above, it is known in the prior art to mold preformed beaded polystyrene inserts for subsequent inclusion in the internal cavities of masonry blocks. A typical expandable polystyrene (EPS) molding facility will employ the following techniques to manufacture these preformed inserts:
1. Raw material is purchased in a bulk density of 38–40 pounds per cubic foot.
2. The raw material is pre-expanded to a desired end product density in the range of from about 1.0 to about 1.5 pounds per cubic foot.
3. After the pre-expanded beads are aged for a suitable period of time they are conveyed by air to a molding machine.
4. Matched metal molds, usually of aluminum, are mounted in the molding machine to receive the pre-expanded beads.
5. The pre-expanded beads are fed into cavities defined by the matched molds by either slide runner fill systems or E.P.S. fill guns. The molds are either provided with proper machined venting, or are crack-filled to permit air to excape during this filling operation.
6. Steam is injected into the cavities through suitable passages in both mold halves to fuse the beads together into a coherent mass.
7. Since the fused particles will continue to expand while hot, it is desirable, if not necessary, to cool the molds before they are opened to remove the end product.
8. When the end product is adequately cooled it is removed from the mold, packaged, inventoried and shipped.

It is typical to employ molding cycles in excess of ninety (90) seconds to fabricate the preformed polystyrene inserts. This high cycle time is required primarily because of the necessity to cool both mold halves prior to opening the mold in order to cool the preformed inserts sufficiently to prevent undesired post-expansion.

A typical modern concrete block molding facility will employ the following techniques to manufacture masonry blocks:
1. Cement, water and other necessary aggregates are premixed and dumped into a hopper above the masonry block forming machine.
2. A proper amount of material is then fed into the block molds, and the machine is cycled to form the molds in the "green" (freshly molded) state. These blocks are uncured and are quite fragile.
3. The "green" blocks are conveyed to racks and cured in a kiln.
4. As the "green" blocks are conveyed to the kiln, cured blocks are automatically taken from the racks and conveyed to a cubing (i.e. stacking) station.
5. The cubes of masonry blocks are then ready for delivery to the building site.

In a typical production operation three 8-inch blocks are produced every 8 to 9 seconds.

It should be apparent from the above discussion that there is a significant difference between the cycle time necessary to mold preformed inserts from expandable polystyrene, and the cycle time necessary to form masonry building blocks. Therefore, even though expandable polystyrene is a highly desirable material for insulating masonry building blocks, no one has ever thought it possible, prior to the instant invention, to marry the polystyrene molding technology with the significantly different masonry block fabrication technology and come up with a commercially feasible and economical technique for the in-situ molding of expandable polystyrene layer(s) on surfaces of masonry building blocks.

TECHNICAL DISCLOSURE

In accordance with this invention the building block art and the thermoplastic polymer (e.g., polystyrene) molding art; representing significantly different technologies; are coupled in a unique manner to provide a method and apparatus for insulating the building blocks with a fused layer(s) of thermoplastic polymer particles.

In this invention an insulating layer of expandable thermoplastic polymer particles, such as polystyrene, is molded in-situ on one or more interior surfaces of an internal cavity of a building block (e.g. masonry block) by employing a unique technique that will allow the expandable polystyrene to be molded commercially in conjunction with the fabrication of the building blocks.

In accordance with this invention applicant has discovered that a male plug with steam ports can be coupled with a building block, without such ports, to form a complete E.P.S. mold. This is in distribution to the prior art which required the use of metal male and female members; each of which included steam ports through which steam was directed to achieve the desired fusion of the beaded thermoplastic particles. In this invention applicant recognized that the masonry building block could be employed as one mold half, and that the porosity of this block inherently would provide the necessary venting for air and steam during the filling and steaming operations, respectively. In the Barnhardt patent there is absolutely no recognition of the venting attributes associated with masonry building blocks. In fact, during the filling operation in Barnhardt the peripheral cavities communicate with the atmosphere. Therefore, Barnhardt had absolutely no need to even consider whether masonry building blocks had any venting attributes.

Applicant also discovered that a masonry building block acts as an efficient heat sink to remove heat from the fused thermoplastic polymer after the steaming operation. The efficient heat removal properties associated with the block are achieved, in part, because the block is not heated during the molding operation by injecting steam directly through it. This is significantly different from the prior art techniques for molding beaded polystyrene in which steam is directed through both male and female mold halves.

In accordance with this invention the male plug can be removed from the masonry block shortly after the steam injecting operation, and in fact, a cycle time of less than fifteen (15) seconds can be achieved. Although some post-expansion of the polystyrene will take place upon the quick withdrawal of the male plug member, this expansion will be minimized due to the fact that the masonry block itself is not excessively hot. In conventional polystyrene molding operations the female mold generally is quite hot, as a result of injecting steam directly through it. Therefore, if the male plug is removed prior to cooling the female mold to a suitably low level, excessive post expansion still can take place. The cooling step required in the prior art to prevent excessive post expansion creates undesirably long cycle times. Such a cooling step is not necessary in the instant invention because the masonry block which is employed as one of the mold elements is not directly heated by steam. Therefore, cycle times in this invention can be kept to a minimum.

Since the fused, particulate insulating layer is confined by interior walls of the masonry block cavity, any post expansion which does take place will generally occur only inwardly and upwardly. Downward expansion generally is prevented by a lower support platen upon which the block is retained during the molding operation. Outward expansion generally is impeded by the interior surfaces defining the cavity. However, what outward expansion does take place is beneficial since it causes the insulating layer(s) to fill any voids, recesses, or other relief areas existing or formed in the interior cavity surface. This provides an extremely efficient insulating interface between the fused thermoplastic particles and the interior surface(s) of the cavity.

Applicant discovered, quite surprisingly, that fusing the particles by injecting steam under pressure into the peripheral compartment between the male plug member and the walls of the building block caused the walls of the building block adjacent to the cavity to crack. Apparently the fused particles seal the pores of the masonry building block to cause an excessive pressure build-up in the peripheral compartment; thereby causing the block to crack.

Applicant discovered that even supporting the block within an outer shell during the molding operation would not necessarily prevent the block from cracking. However, applicant surprisingly did find that the application of a positive external force to opposed exterior surfaces of the block; preferably to opposed surfaces aligned with interior surfaces to which the insulating layer is fused; will, if sufficiently high, prevent the block from cracking.

The molding method of this invention includes the steps of:

positioning a male plug member within the internal cavity of the building block with at least one peripheral wall of the plug member spaced from at least one interior surface of the cavity to form a peripheral compartment;

directing the polymer particles into the peripheral compartment;

injecting steam, under pressure, into the peripheral compartment to expand said polymer particles and cause them to fuse together into a self-sustaining, insulating layer in close conformity with each interior surface of the peripheral compartment, and, while injecting steam under pressure into the peripheral compartment;

applying a counteracting, inwardly directed external force to exterior surfaces of at least two opposed walls of the block, an insulating layer being expanded into close conformity with the interior surface of at least one of said opposed walls;

terminating the steam injecting step;

removing the male plug member from within the internal cavity of the building block; and removing the external force applied to the opposed exterior surfaces of the block.

Preferably each interior surface of the cavity is spaced from a corresponding peripheral surface of the plug so that the peripheral compartment extends around the entire perimeter of the cavity. However, it is within the scope of this invention to space one or more, but less than all of the interior surfaces of the cavity from corresponding peripheral surfaces of the plug, in which case the peripheral compartment will not extend about the entire perimeter of the cavity.

In accordance with the most preferred form of this invention the male plug member extends outwardly from a first platen that seals one end of the internal cavity of the block when the plug is in proper position for carrying out the molding operation. This platen preferably includes a plenum chamber through which steam can be directed, and this plenum chamber preferably communicates with passages extending through peripheral walls of the male plug member to permit the steam to be injected into the peripheral compartment through the male plug passages. This platen also includes an opening aligned with the peripheral compartment between the male plug member and the interior surfaces of the building block cavity, and the polymer particles can be injected into the peripheral compartment through this latter opening.

Other objects and advantages of this invention will be better understood by referring to the detailed description which follows, taken in conjunction with the drawings.

BEST MODE FOR CARRYING OUT THE INVENTION

Figure 1:
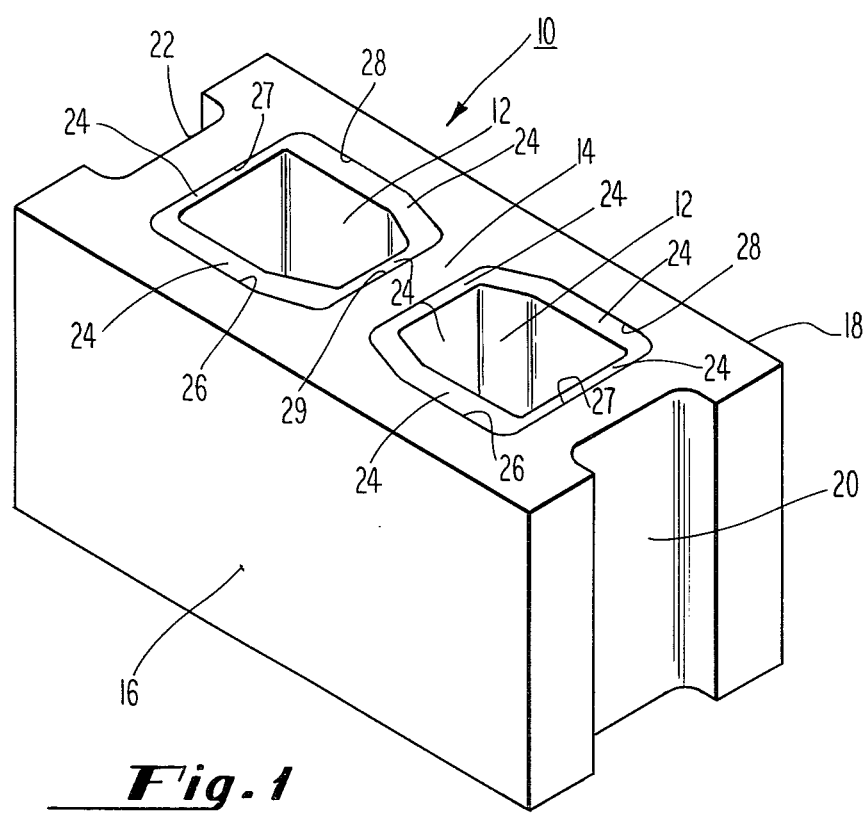
FIG. 1 is an isometric view of an insulating building block in accordance with this invention.

Referring to FIG. 1 a building block 10, such as a concrete masonry block, includes two internal cavities 12 separated by an intermediate web section, or wall 14. In addition, the block includes opposed, longitudinally extending sidewalls 16 and 18, and opposed endwalls 20 and 22. It should be understood that the method of this invention can be employed with building blocks including one or multiple cavities; the two-cavity construction being illustrated herein because it is quite commonly employed in the building industry.

Still referring to FIG. 1 a molder layer of fused, expandable polystyrene is expanded into conformity with the interior surfaces of each cavity 12. Although a layer is shown as being fused to each of the interior surfaces 26, 27, 28 and 29, for some uses it may not be necessary to insulate all of these surfaces.

Figure 2:
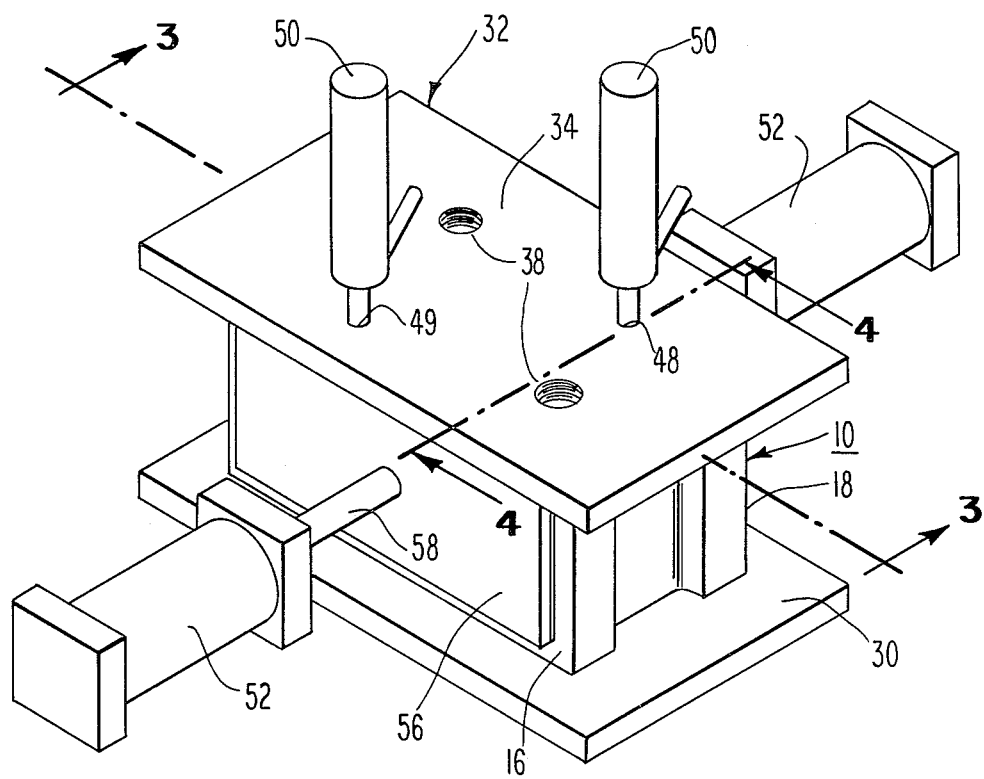
FIG. 2 is an isometric view of the building block shown in FIG. 1, but confined by apparatus of this invention for carrying out the method of this invention.
Figure 3:
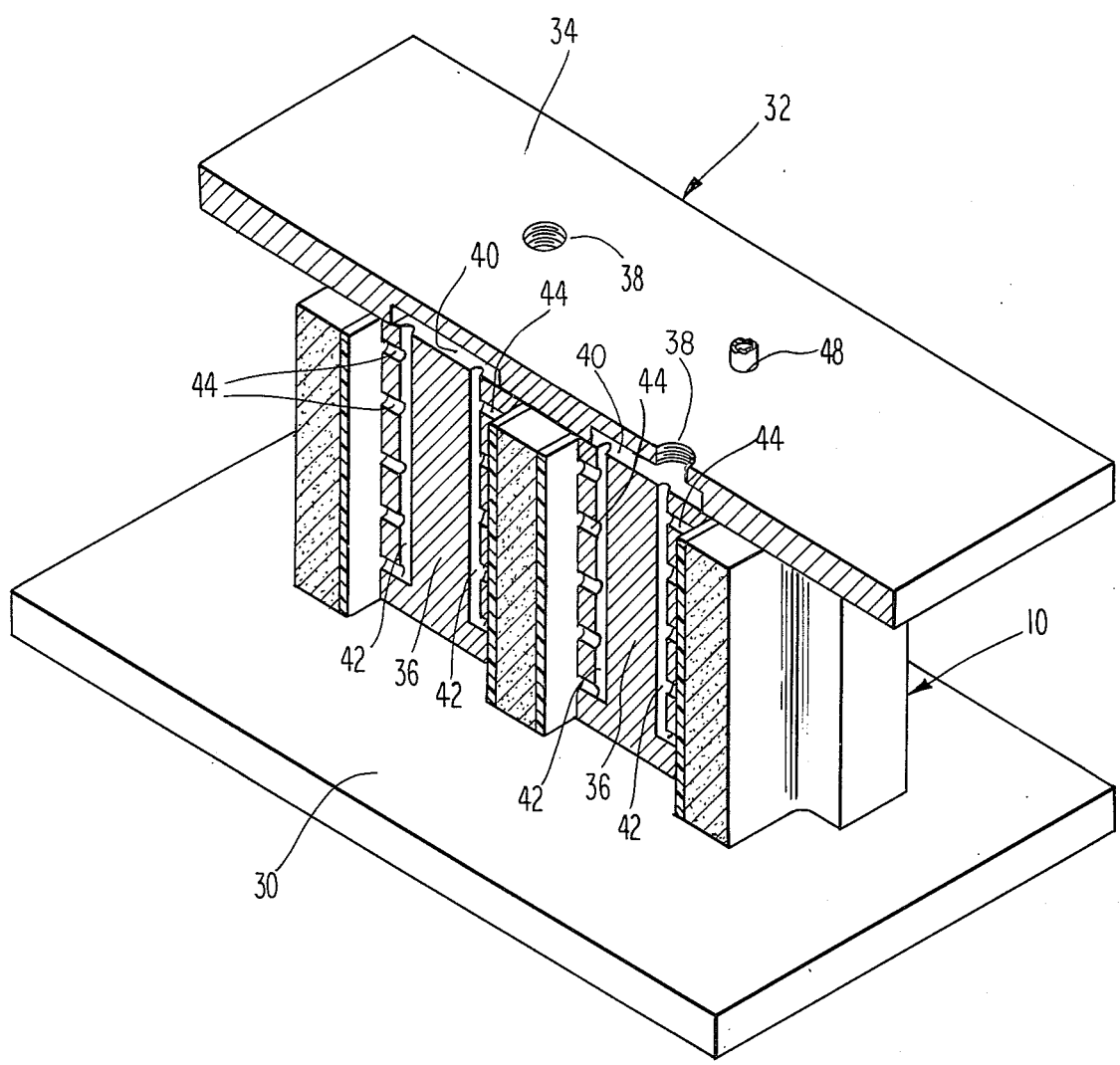
FIG. 3 is a sectional view taken along line 3—3 of FIG. 2.
Figure 4:
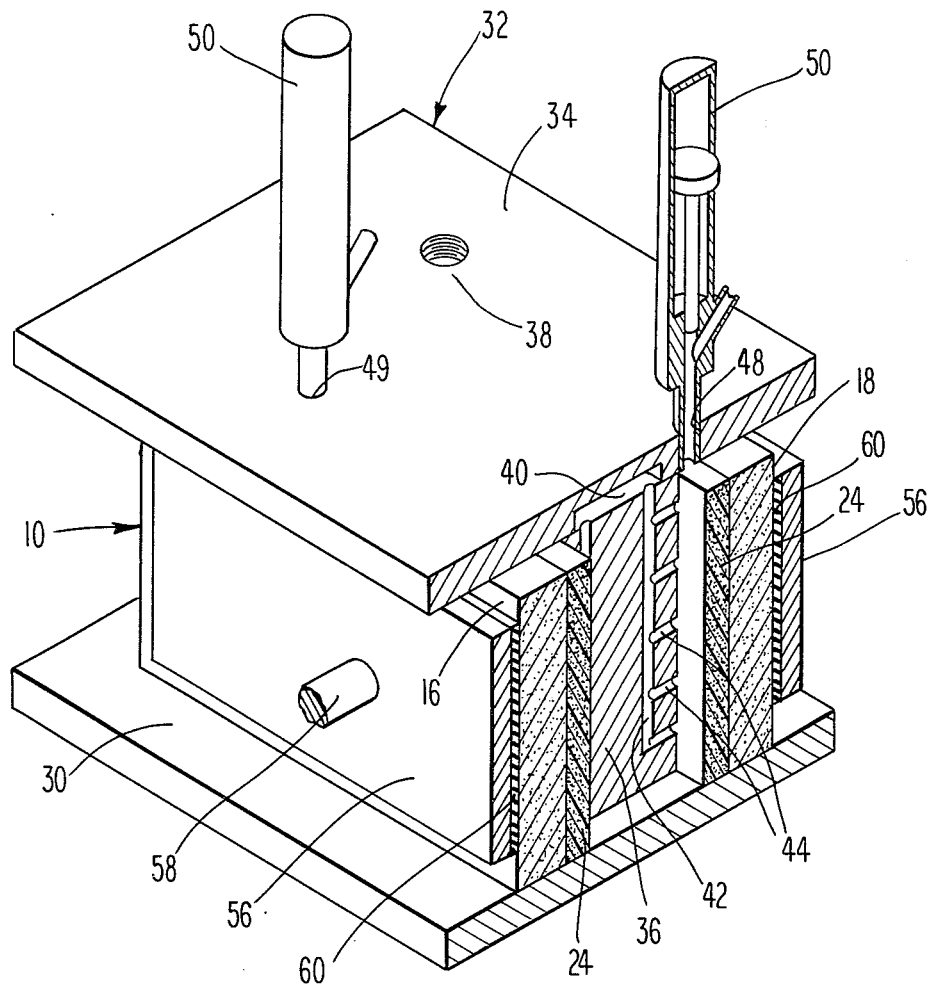
FIG. 4 is a sectional view taken along line 4—4 of FIG. 2.

FIGS. 2-4 show the preferred apparatus for carrying out the method of this invention. In accordance with this method, the building block 10 is supported on a lower platen 30; preferably formed of stainless steel or other noncorrosive material, and this platen closes off the lower entrance into the cavities 12.

A male core mold 32 includes a top platen 34 and downwardly directed plug members 36 that preferably are tapered. Preferably the interior surfaces defining the internal cavities 12 of the block 10 also are tapered; the taper of the plug members 36 matching the taper of the interior cavities to provide a substantially constant-thickness peripheral compartment from top to bottom thereof.

As can be seen best in FIGS. 3 and 4, steam passages 38 extend through the top platen 34, and each communicates with a plenum chamber 40. Each plenum chamber communicates with vertically extending feeder lines, or passages 42 that extend into a corresponding plug section 36. A series of branch lines, or passages 44 communicate with the feeder lines 42 and extend through peripheral side and endwalls of each of the plug members 36. Thus, it can be seen that steam injected under pressure through the passages 38 will be directed through the plenum chambers 40, feeder lines 42 and branch lines 44 into the peripheral compartment of each cavity 12.

Referring to FIGS. 2-4, passages 48 and 49 also extend through the top platen 34 of the male core mold 32, and each of these passages is aligned with the peripheral compartment of a respective internal cavity 12. Conventional fill guns 50 can be employed to direct the expanded polystyrene through the passages 48 and 49 to fill the peripheral compartments in preparation for molding.

A most important aspect of this invention resides in the provision of a positive pressure-applying system for exerting a positive external force on the opposed outer longitudinal surfaces of the building block sidewalls 16 and 18. As can be seen best in FIGS. 2-4, the preferred pressure-applying system includes fluid-actuated (e.g. pneumatic) cylinders 52 on opposed longitudinally sides of the block 10, and each cylinder has a force-applying platen 56 connected to the outer end of a respective piston rod 58. Each platen 56 preferably includes a conformable layer 60, such as neoprene rubber, as the outer member to compensate for surface irregularities in the outer longitudinally sidewalls 16 and 18. It should be understood that each platen 56 itself can be made sufficiently conformable to permit its use without a separate layer; however, the most preferred form of this invention employs generally rigid platens 56 with conformable rubber layers 60 connected to them. If desired only one of the platens 56 can be connected to a fluid-actuated cylinder, and the opposed platen can be mounted against movement. The block can be squeezed between these platens by actuation of the single cylinder to apply the positive external force to the opposed outer surfaces of the sidewalls 16 and 18.

In accordance with the method and apparatus of this invention the masonry block 10 is firmly confined between the lower platen 30, and the top platen 34 of the male core mold 32. Thereafter, expandable polystyrene is injected into the peripheral compartments of the respective cavities 12 through the passages 48 and 49 in the top platen 34. A positive pressure is then applied to the outer surfaces of the longitudinal sidewalls 16 and 18 and is maintained against these sidewalls during the entire period that steam is being injected into the peripheral compartments through the steam passages 38 in the top platen 34, and then through the respective connecting passages associated with the male plug members 36. The steam has been injected into the peripheral compartments at a pressure in the range of 10-25 psi but lower pressures may be useable. The steam only needs to be directed into the peripheral compartments for a short period of time (e.g. three (3) seconds) to cause the expandable polystyrene to expand and fuse together into a coherent insulating layer that also expands into close conformity with the interior surfaces of the internal cavity. This molding operation causes the expandable polystyrene to fuse into close conformity with the surface configuration of the interior surfaces 26, 27, 28 and 29 of the cavities 12. This close conformity can be established in cavities of differing sizes, and also with irregular cavity surfaces, such as surfaces provided with relief areas in them to enhance thermal insulating properties. The close conformity of the insulating layer with the cavity surfaces provides an excellent insulating building block construction.

Applicant found, quite surprisingly, that the molding of the expandable polystyrene layers 24 cannot be effectively accomplished without applying a positive external force to at least the opposed longitudinal sidewalls 16 and 18 of the masonry block as the steam is being injected, under pressure, into the peripheral compartments containing the expandable polystyrene. If the positive pressure is not applied to the external sidewalls 16 and 18, the pressure build-up within the peripheral compartments created by the injection of pressurized steam will cause the masonry block 10 to fail; particularly by cracking in the intermediate wall 14 and the endwalls 20 and 22. In fact, in some instances cracking will also occur through the sidewalls 16 and 18, in the regions aligned with the internal cavities 12.

In accordance with one mode of operation steam was injected through a male plug member under a pressure of 22 psi to impose a force of approximately 900 pounds on the interior surfaces of longitudinally extending sidewalls 16 and 18. Under these conditions the block failed by cracking in the intermediate wall 14 and endwalls 20 and 22 even when the pressure-applying systems 52 were controlled to apply an external force to the longitudinally extending sidewalls 16 and 18 as high as 500 pounds. Applicant did find that applying an external force on the order of approximately 720 pounds to each sidewall 16 and 18 was adequate to prevent failure of the block 10.

It is believed that the specific exterior pressure that will need to be applied to the longitudinally extending sidewalls will vary depending upon the particular strength of the masonry block, as well as the duration and pressure of steam injection. However, it was found that merely confining the building block at its longitudinally extending sidewalls 16 and 18, without the application of a substantial external force to said sidewalls, was inadequate to prevent block failure during the molding operation. In some instances, it is believed that it will be necessary to also provide an external confining force to the outer surfaces of the block endwalls 20 and 22. However, at the very least, it is most desirable to apply opposed external forces to the longitudinal sidewalls 16 and 18 in the regions aligned with the interior longitudinal surfaces 26 and 28 of the internal cavity 12 to which the beaded polystyrene is being molded.

Applicant has found that the molding operation of this invention can be carried out at sufficiently high speeds (e.g. less than 15 seconds) to permit it to be efficiently "married" with the masonry block forming operation to permit the economical and reliable fabrication of insulating building blocks on a commercial basis. In fact, the method described and claimed herein represents the only commercially useable approach applicant is aware of for the in-situ molding of expanded polystyrene insulating layers within the internal cavities of masonry blocks.

Having described my invention, I claim:

1. A method of forming a molded insulating layer from expandable thermoplastic polymer particles on interior surfaces of an internal cavity of a concrete masonry block; said method including the steps of:
  positioning a male plug member within the internal cavity of the masonry block with at least one peripheral wall of the plug member spaced from at least one interior surface of the cavity to form a peripheral compartment;
  directing the polymer particles into the peripheral compartment;
  injecting steam under pressure into the peripheral compartment to cause the particles to expand and fuse together into substantially self-sustaining insulating layers in close conformity with each interior surface of the peripheral compartment, and while injecting steam under pressure into the peripheral compartment;
  applying a counteracting inwardly directed external force, of a sufficient magnitude to prevent the block from cracking, to exterior surfaces of at least two opposed walls of the block, an insulating layer being expanded into close conformity with the interior surface at least one of said opposed walls;
  terminating the steam injecting step;
  removing the male plug member from within the internal cavity of the block; and
  removing the external force applied to the opposed exterior surfaces of the block.

2. The method of claim 1 wherein all of the steps are completed in less than 15 seconds.

3. The method of claim 1 wherein steam is injected into the peripheral compartment through passages extending through peripheral walls of the male plug member.

4. The method of claim 3 wherein the male plug member extends outwardly from a first platen; including the steps of supporting one surface of the block on a second platen closing one end of the internal cavity and closing the other end of the cavity with the first platen from which the plug member extends, with the plug member positioned within the cavity to form the peripheral compartment, and directing the polymer particles into the peripheral compartment through an opening in one of the platens and injecting the steam under pressure through a passage in one of the platens, said last-referenced passage communicating with the passages in the male plug member that communicate with the peripheral compartment.

5. The method of claim 1 wherein the counteracting inwardly directed external force is applied prior to commencing the steam injecting step and is maintained against the longitudinal surfaces of the block during the entire period of time that steam is being injected into the peripheral compartment.

6. The method according to claim 5 including applying a counteracting, inwardly directed force in excess of 500 pounds to each of the opposed outer longitudinal surfaces in the region aligned with interior longitudinal surfaces of the cavity to which the polymer particles are fused into a molded insulating layer.

7. The method according to either claims 4 or 6 wherein the polymer particles are expandable polystyrene beads.

8. A concrete masonry block including a fused insulating layer of polymer particles molded to interior surfaces of an internal cavity thereof in accordance with the method of claim 1.

9. An apparatus for forming a molded insulating layer from expandable thermoplastic polymer particles on interior surfaces of an internal cavity of a concrete masonry block; said apparatus including:
  a male plug member dimensioned to be inserted within the internal cavity of the block with peripheral walls of said plug member spaced from interior surfaces of the cavity to form a peripheral compartment, said plug member including passages extending through external walls thereof through which steam, under pressure, can be directed into said peripheral compartment;
  a platen joined to the male plug member and adapted to close one end of the cavity when the male plug member is inserted within the cavity in position for carrying out the molding operation, said platen including a passageway communicating with the peripheral compartment through which the polymer particles can be injected into said peripheral compartment, said upper platen further including a second passageway communicating with the passages extending through the external walls of said plug member; and pressure-applying means for engaging opposed longitudinally extending sidewalls of the block and for applying an external, inwardly directed force thereto of a sufficient magnitude for counteracting the outwardly directed force created by the injection of steam, under pressure, into the peripheral compartment of the block cavity to thereby prevent said masonry block from cracking.

10. The apparatus of claim 9 wherein said pressure-applying means includes a fluid-actuated cylinder controlling at least one member adapted to engage an external surface of the longitudinally extending sidewall of the block to apply an inwardly directed force to said sidewall.

11. The apparatus of claim 10 wherein opposed members for applying the external force to the longitudinally extending sidewalls of the block are each controlled by fluid-actuated cylinders.

* * * * *